(12) United States Patent
Hall et al.

(10) Patent No.: US 9,205,357 B2
(45) Date of Patent: Dec. 8, 2015

(54) CARBON DIOXIDE SEPARATION SYSTEM AND METHOD

(71) Applicant: The Boeing Company, Chicago, IL (US)

(72) Inventors: John C. Hall, Rancho Palos Verdes, CA (US); D. Anthony Galasso, Trabuco Canyon, CA (US); Jon A. Magnuson, Corona del Mar, CA (US)

(73) Assignee: The Boeing Company, Chicago, IL (US)

( * ) Notice: Subject to any disclaimer, the term of this patent is extended or adjusted under 35 U.S.C. 154(b) by 308 days.

(21) Appl. No.: 13/767,115

(22) Filed: Feb. 14, 2013

(65) Prior Publication Data

US 2013/0255486 A1 Oct. 3, 2013

Related U.S. Application Data

(60) Provisional application No. 61/617,554, filed on Mar. 29, 2012, provisional application No. 61/617,574, filed on Mar. 29, 2012.

(51) Int. Cl.
*B01D 53/24* (2006.01)
*B01D 45/16* (2006.01)
*E21B 43/16* (2006.01)

(52) U.S. Cl.
CPC ............... *B01D 45/16* (2013.01); *B01D 53/24* (2013.01); *E21B 43/164* (2013.01); *B01D 2256/24* (2013.01); *B01D 2257/504* (2013.01); *B01D 2257/80* (2013.01); *Y02C 10/04* (2013.01); *Y02C 10/08* (2013.01)

(58) Field of Classification Search
CPC .... B01D 45/16; B01D 53/24; B01D 2257/80; B01D 2256/24; B01D 2257/504; E21B 43/164; Y02C 10/08; Y02C 10/04
USPC ......... 55/461, 437, 459.1, 447; 95/31, 34, 35; 166/305.1
See application file for complete search history.

(56) References Cited

U.S. PATENT DOCUMENTS

| | | | |
|---|---|---|---|
| 3,359,707 | A | 12/1967 | Louis |
| 3,493,339 | A | 2/1970 | Wheldon et al. |
| 3,660,967 | A | 5/1972 | Collins et al. |
| 3,853,507 | A | 12/1974 | Monroe et al. |

(Continued)

FOREIGN PATENT DOCUMENTS

| | | |
|---|---|---|
| DE | 4003533 | 8/1990 |
| DE | 4003533 A1 | 8/1990 |

(Continued)

OTHER PUBLICATIONS

Extended European Search Report issued in EP12180636.8 (Dec. 14, 2012).

(Continued)

*Primary Examiner* — Dung H Bui
(74) *Attorney, Agent, or Firm* — Walters & Wasylyna LLC

(57) ABSTRACT

A separation system including a source of a gaseous mixture, the gaseous mixture comprising at least a first constituent and a second constituent, and a separation unit in communication with the source to receive the gaseous mixture and at least partially separate the first constituent from the second constituent, wherein the separation unit comprises at least one of a vortex separator and a pressure vessel.

15 Claims, 5 Drawing Sheets

(56) References Cited

U.S. PATENT DOCUMENTS

| | | | |
|---|---|---|---|
| 4,094,652 A | 6/1978 | Lowther | |
| 4,249,915 A * | 2/1981 | Sircar et al. | 95/99 |
| 4,312,641 A | 1/1982 | Verrando et al. | |
| 4,322,394 A | 3/1982 | Mezey et al. | |
| 4,484,933 A | 11/1984 | Cohen | |
| 4,551,197 A | 11/1985 | Guilmette et al. | |
| 4,726,815 A | 2/1988 | Hashimoto et al. | |
| 4,784,672 A | 11/1988 | Sircar | |
| 4,797,141 A | 1/1989 | Mercader et al. | |
| 4,832,711 A | 5/1989 | Christel et al. | |
| 5,059,405 A | 10/1991 | Watson et al. | |
| 5,100,635 A | 3/1992 | Krishnamurthy et al. | |
| 5,221,520 A | 6/1993 | Cornwell | |
| 5,232,474 A | 8/1993 | Jain | |
| 5,233,837 A | 8/1993 | Callahan | |
| 5,261,250 A | 11/1993 | Missimer | |
| 5,282,886 A | 2/1994 | Kobayashi et al. | |
| 5,749,230 A | 5/1998 | Coellner | |
| 6,022,399 A | 2/2000 | Ertl et al. | |
| 6,027,548 A | 2/2000 | Ackley et al. | |
| 6,183,539 B1 | 2/2001 | Rode et al. | |
| 6,293,999 B1 | 9/2001 | Cheng et al. | |
| 6,332,925 B1 | 12/2001 | Noji et al. | |
| 6,337,063 B1 | 1/2002 | Rouleau et al. | |
| 6,502,328 B1 | 1/2003 | Love et al. | |
| 6,621,848 B1 | 9/2003 | Ullman et al. | |
| 6,706,097 B2 | 3/2004 | Zornes | |
| 6,712,879 B2 | 3/2004 | Kato et al. | |
| 7,736,416 B2 | 6/2010 | Nalette et al. | |
| 7,947,120 B2 | 5/2011 | Deckman et al. | |
| 8,435,335 B2 | 5/2013 | Lam et al. | |
| 2001/0009124 A1 | 7/2001 | Suzuki et al. | |
| 2005/0121393 A1 | 6/2005 | Galbraith | |
| 2007/0231233 A1 * | 10/2007 | Bose | 423/245.1 |
| 2008/0000351 A1 | 1/2008 | Celik et al. | |
| 2008/0200742 A1 | 8/2008 | Doyle et al. | |
| 2008/0314245 A1 | 12/2008 | Hershkowitz et al. | |
| 2009/0232861 A1 | 9/2009 | Wright et al. | |
| 2009/0294366 A1 | 12/2009 | Wright et al. | |
| 2009/0311146 A1 | 12/2009 | Ohno et al. | |
| 2010/0000221 A1 * | 1/2010 | Pfefferle | 60/772 |
| 2010/0024476 A1 | 2/2010 | Shah | |
| 2010/0251887 A1 | 10/2010 | Jain | |
| 2010/0251937 A1 | 10/2010 | Murray et al. | |
| 2010/0284904 A1 | 11/2010 | Castaldi et al. | |
| 2010/0314136 A1 * | 12/2010 | Zubrin | E21B 43/164 166/402 |
| 2011/0088550 A1 | 4/2011 | Tirio | |
| 2011/0107914 A1 | 5/2011 | Su et al. | |
| 2011/0189075 A1 | 8/2011 | Wright et al. | |
| 2011/0247491 A1 | 10/2011 | Leitgeb et al. | |
| 2011/0296872 A1 | 12/2011 | Eisenberger | |
| 2012/0000365 A1 | 1/2012 | Okano et al. | |
| 2012/0017638 A1 * | 1/2012 | Prast et al. | 62/602 |
| 2012/0048111 A1 | 3/2012 | Nakao et al. | |
| 2012/0204720 A1 | 8/2012 | Tschantz et al. | |
| 2013/0047664 A1 | 2/2013 | DiCenzo | |
| 2013/0192296 A1 * | 8/2013 | Betting et al. | 62/602 |
| 2014/0053761 A1 | 2/2014 | Galasso | |

FOREIGN PATENT DOCUMENTS

| | | |
|---|---|---|
| GB | 2171927 | 9/1986 |
| WO | WO 2012/013596 | 2/2012 |
| WO | WO 2012/030223 | 3/2012 |
| WO | WO 2013/010328 | 1/2013 |

OTHER PUBLICATIONS

Amato et al., "Methane Oxycombustion for Low $CO_2$ Cycles: Blowoff Measurements and Analysis," *Journal of Engineering for Gas Turbines and Power*, vol. 133 (Jun. 2011).

Smardzewski et al., "A Laboratory Study of the Dielectric Heating of Molecular Sieve Material," *Naval Research Laboratory*, (May 27, 1980).

Choi et al., "Adsorbent Materials for Carbon Dioxide Capture from Large Anthropogenic Sources," *ChemSusChem Journal*, vol. 2, pp. 796-854 (2009).

Konduru et al., "Curbing Greenhouse Effect by Carbon Dioxide Adsorption with Zeolite 13x," *AIChE Journal*, vol. 53, No. 12 (2007).

Cavenati et al., "Adsorption Equilibrium of Methane, Carbon Dioxide, and Nitrogen on Zeolite 13X at High Pressures," Journal of Chemical Engineering Data, vol. 49, pp. 1095-1101 (2004).

Siemons et al., "Assessing the Kinetics and Capability of Gas Adsorption in Coals by a Combined Adsorption/Diffusion Method," *SPE Annual Technical Conference and Exhibition* (Denver, CO, 2003).

Extended European Search Report, EP 13 16 0170 (2014).

* cited by examiner

CARBON DIOXIDE SEPARATION SYSTEM AND METHOD

PRIORITY

This application claims priority from U.S. Ser. No. 61/617,554 filed on Mar. 29, 2012, and U.S. Ser. No. 61/617,574 filed on Mar. 29, 2012.

FIELD

This application relates to fractional separation and, more particularly, to systems and methods for fractional separation of a gaseous mixture containing carbon dioxide.

BACKGROUND

An oil well typically collects approximately 30 percent of its oil from an underground oil reservoir during the primary recovery phase. An additional 20 percent of the oil may be recovered using secondary recovery techniques, such as water flooding that raises the underground pressure. Enhanced oil recovery ("EOR") provides a tertiary recovery technique capable of recovering an additional 20 percent or more of the oil from the underground reservoirs.

During the EOR process, large quantities of gas are injected into the underground oil reservoir, thereby urging additional oil from the well. Carbon dioxide is typically used as the EOR gas due to its ability to mix with the underground oil and render the oil less viscous and more readily extractable.

Much of the carbon dioxide injected into the oil well is recovered with the recovered oil. However, the recovered carbon dioxide typically contains significant quantities of other constituents, such as water vapor, methane, ethane, propane, butane and pentane. Reuse of carbon dioxide contaminated with these constituents in the EOR process is believed to significantly reduce operating efficiency.

Existing separation techniques, such as amine separation, solvent separation and molecular sieve separation, are inefficient for separating carbon dioxide from gaseous oil well effluent due to the relatively high percentage of carbon dioxide in the effluent. Other techniques, such as oxygen burning, waste the hydrocarbon resource in the effluent.

Accordingly, those skilled in the art continue with research and development efforts in the field of carbon dioxide separation from gaseous oil well effluent.

SUMMARY

In one embodiment, the disclosed separation system may include a source of a gaseous mixture, the gaseous mixture including at least a first constituent and a second constituent, and a separation unit in communication with the source to receive the gaseous mixture and at least partially separate the first constituent from the second constituent, wherein the separation unit includes at least one of a vortex separator and a pressure vessel.

In another embodiment, the disclosed system for vortex-induced separation of a gaseous mixture may include a source of a gaseous mixture, the gaseous mixture including at least a first constituent and a second constituent, and a vortex separator in communication with the source, the vortex separator being configured to receive the gaseous mixture and apply a vortex flow to the gaseous mixture to at least partially separate the first constituent from the second constituent.

In another aspect, disclosed is a separation system that includes a source of a gaseous mixture, the gaseous mixture including at least a first constituent and a second constituent, a pressure vessel in communication with the source, and a pump in fluid communication with the source and the pressure vessel, wherein the pump pumps the gaseous mixture into the pressure vessel at a pressure sufficient to separate the gaseous mixture into at least a liquid fraction and a gaseous fraction.

In another embodiment, disclosed is a method for vortex-induced separation of a gaseous mixture. The method may include the steps of (1) providing a gaseous mixture having at least a first constituent and a second constituent, the first constituent being a first percentage of the gaseous mixture, (2) directing the gaseous mixture into a vortex flow path, wherein the vortex flow path effects at least partial separation of the first constituent from the second constituent, and (3) capturing a first fraction of the gaseous mixture from the vortex flow path, the first fraction including the first constituent and the first constituent being a second percentage of the first fraction, wherein the second percentage is greater than the first percentage.

In another embodiment, disclosed is a method for vortex-induced separation of a gaseous mixture that may include the steps of (1) providing a gaseous mixture including carbon dioxide and methane, the carbon dioxide comprising a first weight percentage of the gaseous mixture, (2) directing the gaseous mixture into a vortex flow path, wherein the vortex flow path effects at least partial separation of the carbon dioxide from the methane, and (3) capturing a first fraction of the gaseous mixture from the vortex flow path, the first fraction including carbon dioxide, the carbon dioxide comprising a second weight percentage of the first fraction, wherein the second weight percentage is greater than the first weight percentage.

In another embodiment, disclosed is a method for separating a gas from a gaseous mixture by liquefaction. The method may include the steps of (1) providing a gaseous mixture having at least a first constituent and a second constituent, the first constituent forming a first weight percentage of the gaseous mixture, (2) pressurizing the gaseous mixture to form a liquid fraction and a gaseous fraction, the first constituent forming a second weight percentage of the liquid fraction, the second weight percentage being greater than the first weight percentage, and (3) separating the liquid fraction from the gaseous fraction.

In yet another embodiment, the disclosed separation method may include the steps of (1) providing a gaseous mixture including carbon dioxide and methane, the carbon dioxide comprising a first weight percentage of the gaseous mixture, (2) pressurizing the gaseous mixture to form a liquid fraction and a gaseous fraction, the carbon dioxide comprising a second weight percentage of the liquid fraction, the second weight percentage being greater than the first weight percentage, and (3) separating the liquid fraction from the gaseous fraction.

Other embodiments of the disclosed separation systems and methods will become apparent from the following detailed description, the accompanying drawings and the appended claims.

DETAILED DESCRIPTION

Figure 1:
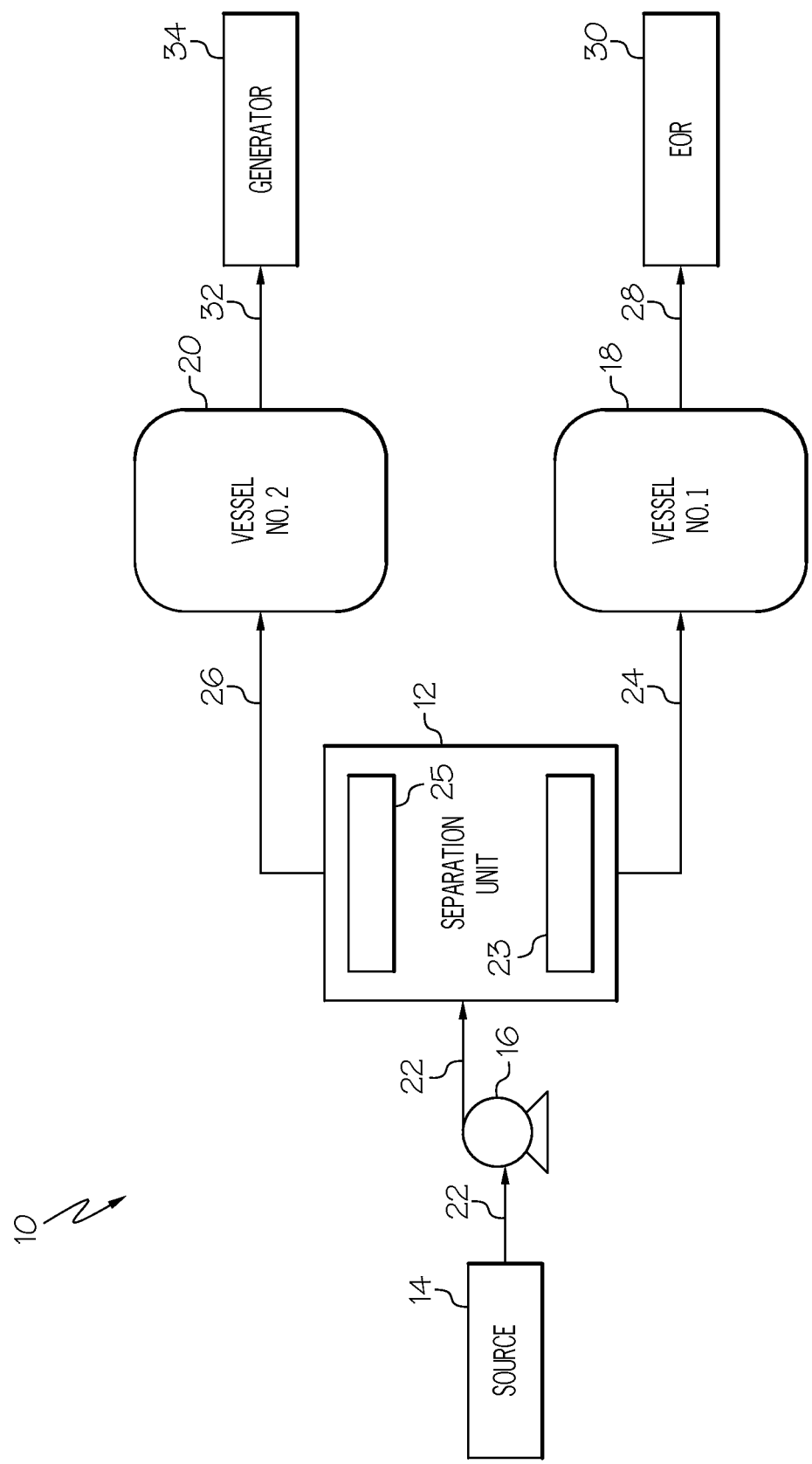
FIG. 1 is a schematic process flow diagram of one embodiment of the disclosed carbon dioxide separation system.

Referring to FIG. 1, one embodiment of the disclosed carbon dioxide separation system, generally designated 10, may include a separation unit 12 and a process gas source 14. The system 10 may additionally include a pump 16, a first vessel 18 and a second vessel 20.

The process gas source 14 may be a source of a gaseous mixture. The gaseous mixture may be any gaseous mixture capable of being separated into at least two parts (or fractions) by way of the separation unit 12 in the manners described in greater detail below.

The gaseous mixture supplied by the gas source 14 may include two or more constituent gases. In a first expression, the gaseous mixture supplied may include three constituent gases. In a second expression, the gaseous mixture supplied may include four constituent gases. In a third expression, the gaseous mixture supplied may include five constituent gases. In a fourth expression, the gaseous mixture supplied may include six or more constituent gases.

The constituent gases of the gaseous mixture may be gases at standard temperature and pressure (i.e., at 0° C. and 1 bar). However, those skilled in the art will appreciate that the temperature and pressure of the gaseous mixture may vary for various reasons (e.g., temperature and pressure conditions at the source 14) without departing from the scope of the present disclosure. The presence of a liquid and/or solid phase within the gaseous mixture as is travels through the system 10 is contemplated, and does not result in a departure from the scope of the present disclosure.

In one particular application of the disclosed system 10, the gas source 14 may be an oil well, and the gaseous mixture supplied to the separation unit 12 may be the gaseous effluent from the oil well's gas-oil separator. When the oil well is subjected to an enhanced oil recovery ("EOR") process using a carbon dioxide, the gaseous mixture obtained from the gas source 14 may be primarily carbon dioxide with a significant concentration of other constituents, such as water vapor and hydrocarbons. The hydrocarbon component of the gaseous mixture may be primarily methane, but may also include longer-chain hydrocarbons, such as ethane, propane, butane and pentane.

As one example, the gaseous mixture supplied by the oil well (source 14) may include at least 80 percent by weight carbon dioxide, with the balance being other constituents such as water vapor and hydrocarbons. As another example, the gaseous mixture supplied by the oil well (source 14) may include at least 85 percent by weight carbon dioxide, with the balance being other constituents such as water vapor and hydrocarbons. As another example, the gaseous mixture supplied by the oil well (source 14) may include at least 90 percent by weight carbon dioxide, with the balance being other constituents such as water vapor and hydrocarbons. As yet another example, the gaseous mixture supplied by the oil well (source 14) may include at least 95 percent by weight carbon dioxide, with the balance being other constituents such as water vapor and hydrocarbons.

The gas source 14 may be in fluid communication with the separation unit 12 by way of fluid line 22. The pump 16 may be provided on fluid line 22 to facilitate the transfer of the gaseous mixture from the gas source 14 to the separation unit 12.

The pump 16 may be controlled to control the pressure of the gaseous mixture being supplied to the separation unit 12. At this point, those skilled in the art will appreciate that the gaseous mixture may be received from the gas source 14 at a relatively high pressure, particularly when the gas source 14 is an oil well. Therefore, additional pressurization by the pump 16 may not be required or desired.

The separation unit 12 may receive the gaseous mixture by way of fluid line 22 and may separate the gaseous mixture into at least a first fraction 23 and a second fraction 25. Various techniques, such as vortex separation and liquefaction, which are discussed in greater detail below, may be employed by the separation unit 12 to effect separation of the gaseous mixture into at least the first and second fractions 23, 25.

The first fraction 23 from the separation unit 12 may be sent to the first vessel 18 by way of fluid line 24. The first vessel 18 may be a holding vessel, a transportation tanker or the like. From the first vessel 18, the first fraction 23 may be sent by fluid line 28 to various downstream applications 30. For example, when the gaseous mixture is recovered from an oil well and the first fraction 23 is substantially purified carbon dioxide, the downstream application 30 may be an oil well application, such as EOR.

The second fraction 25 from the separation unit 12 may be sent to the second vessel 20 by way of fluid line 26. The second vessel 20 may be a holding vessel, a transportation tanker or the like. From the second vessel 20, the second fraction 25 may be sent by fluid line 32 to various downstream applications 34. For example, when the gaseous mixture is recovered from an oil well and the second fraction 25 includes hydrocarbons separated from carbon dioxide, the downstream application 34 may be a generator capable of converting the hydrocarbons into electrical energy (e.g., by combustion).

Figure 2:
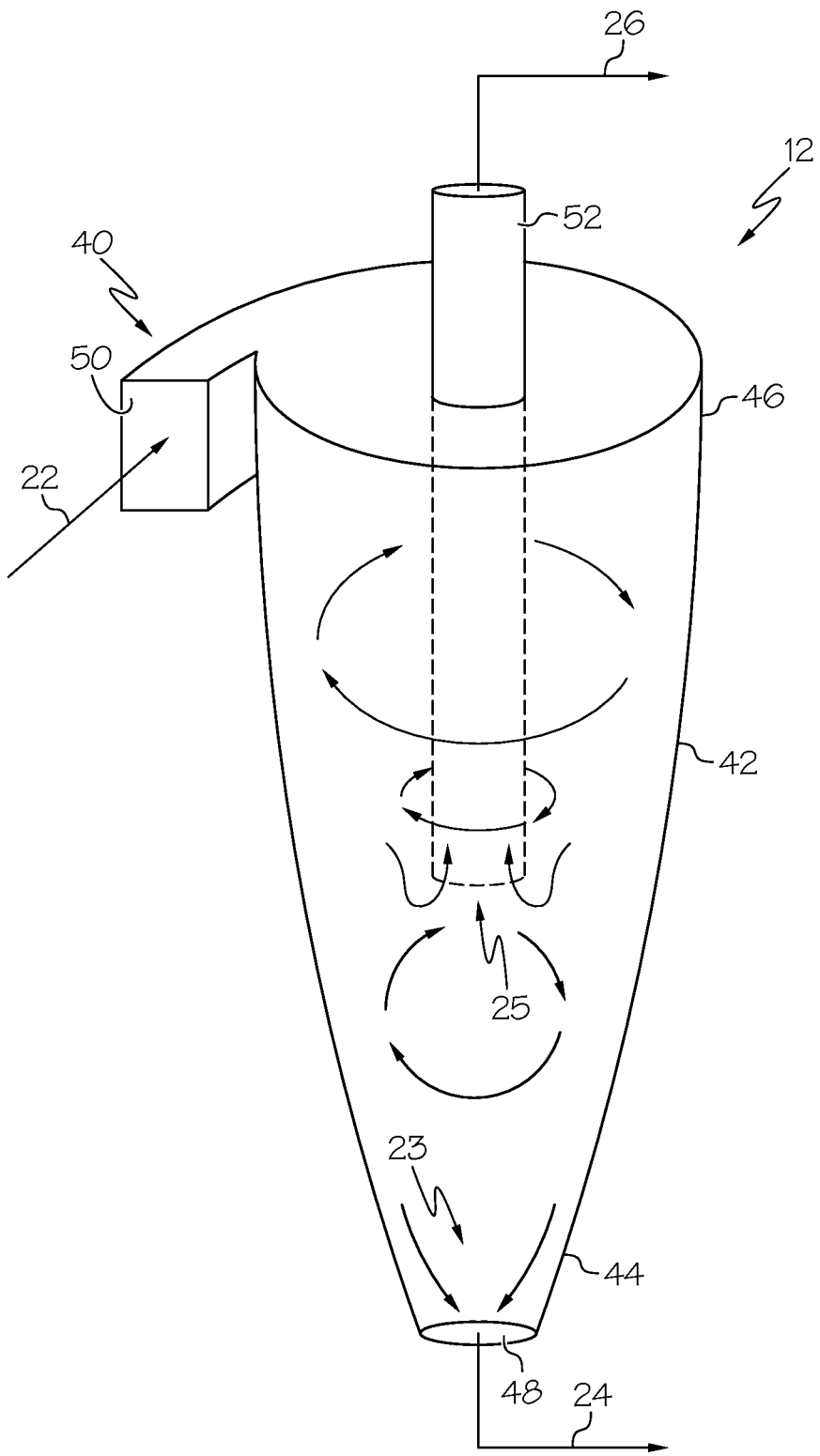
FIG. 2 is a perspective view of a vortex separator being used as the separation unit of the separation system of FIG. 1.

Referring to FIG. 2, in one realization of the disclosed carbon dioxide separation system, the separation unit 12 may be (or may include) a vortex separator 40. The vortex separator 40 may be any apparatus or system capable of subjecting the gaseous mixture (fluid line 22) to a vortex flow to separate the gaseous mixture into at least a first fraction 23 and a second fraction 25. Therefore, the vortex separator 40 may be configured to receive the gaseous mixture by way of fluid line 22 and cause the gaseous mixture to travel in a vortex fluid path.

At least two constituent gases of the gaseous mixture supplied by the fluid line 22 may have a difference in molecular weight sufficient to facilitate vortex-induced separation. As a first example, at least one constituent gas of the gaseous mixture may have a molecular weight that is at most 70 percent of the molecular weight of another constituent gas of the gaseous mixture. As a second example, at least one constituent gas of the gaseous mixture may have a molecular weight that is at most 60 percent of the molecular weight of another constituent gas of the gaseous mixture. As a third example, at least one constituent gas of the gaseous mixture may have a molecular weight that is at most 50 percent of the molecular weight of another constituent gas of the gaseous mixture. As a fourth example, at least one constituent gas of the gaseous mixture may have a molecular weight that is at most 40 percent of the molecular weight of another constituent gas of the gaseous mixture. As a fifth example, at least one constituent gas of the gaseous mixture may have a molecular weight that is at most 37 percent of the molecular weight of another constituent gas of the gaseous mixture.

When the gaseous mixture is recovered from an oil well and is primarily comprised of carbon dioxide, as discussed above, the first fraction 23 may be substantially purified carbon dioxide and the second fraction 25 may include lighter molecular weight constituents, such as water vapor and methane. As one example, the first fraction 23 may include at least 95 percent by weight carbon dioxide. As another example, the first fraction 23 may include at least 96 percent by weight carbon dioxide. As another example, the first fraction 23 may include at least 97 percent by weight carbon dioxide. As another example, the first fraction 23 may include at least 98 percent by weight carbon dioxide. As yet another example, the first fraction 23 may include at least 99 percent by weight carbon dioxide.

Without being limited to any particular theory, it is believed that subjecting the gaseous mixture to a vortex flow may cause the relatively higher molecular weight constituents (e.g., carbon dioxide) of the gaseous mixture to separate from the relatively lower molecular weight constituents (e.g., water vapor and methane) by vortex separation. During vortex separation, the greater momentum of the heavier constituents may urge the heavier constituents radially outward relative to the lighter constituents, thereby providing the opportunity to separate the heavier constituents from the lighter constituents.

Also, without being limited to any particular theory, it is believed that cooling of the gaseous mixture as it expands in the vortex separator 40, per the Joule-Thomson effect, may further facilitate separation of at least one constituent from the gaseous mixture. For example, sufficient cooling of the gaseous mixture may cause carbon dioxide to change phases (e.g., to liquid), while the other constituents of the gaseous mixture remain in the gaseous phase, thereby simplifying separation.

The temperature, pressure and flow rate of the gaseous mixture entering the vortex separator 40 may be controllable parameters, and may be controlled to achieve the desired separation.

In one construction, the vortex separator 40 may be a static apparatus or system. The static vortex separator 40 may be substantially free of moving parts, and may be configured to effect vortex flow of the gaseous mixture based on the shape and configuration of the vortex separator 40 and the angle and direction that the gaseous mixture enters the vortex separator 40 by way of fluid line 22.

As one specific, but non-limiting example, the vortex separator 40 may be configured as a static cyclone separator having generally frustoconical body 42 having a tapered first end 44 and a wider second end 46. The first end 44 of the body 42 may define a first exit port 48 coupled to fluid line 24. The second end 46 of the body 42 may include an inlet port 50 and a second exit port 52. The inlet port 50 may be arranged such that the gaseous mixture circumferentially enters the body 42, thereby directing the gaseous mixture in a vortex flow path. The second exit port 52 may be axially aligned with the body 42, and may be generally centered relative to the body 42. The second exit port 52 may include a pipe or the like that axially extends, at least partially, into the body 42.

Thus, as the gaseous mixture enters the body 42 of the vortex separator 40 by way of the inlet port 50, the gaseous mixture may expand (cool) and may be urged into a vortex flow path. The gaseous mixture may separate into a first fraction 23, which may exit the vortex separator 40 by way of fluid line 24, and a second fraction 25, which may exit the vortex separator 40 by way of fluid line 26.

In another construction, the vortex separator 40 may be a dynamic apparatus or system. A dynamic vortex separator 40 may include fan blades, an impeller, a turbine or the like, which may or may not be connected to a shaft and driven by a motor, and which may urge the gaseous mixture into a vortex flow path. The use of both a dynamic vortex separator and a static vortex separator is also contemplated.

Figure 3:
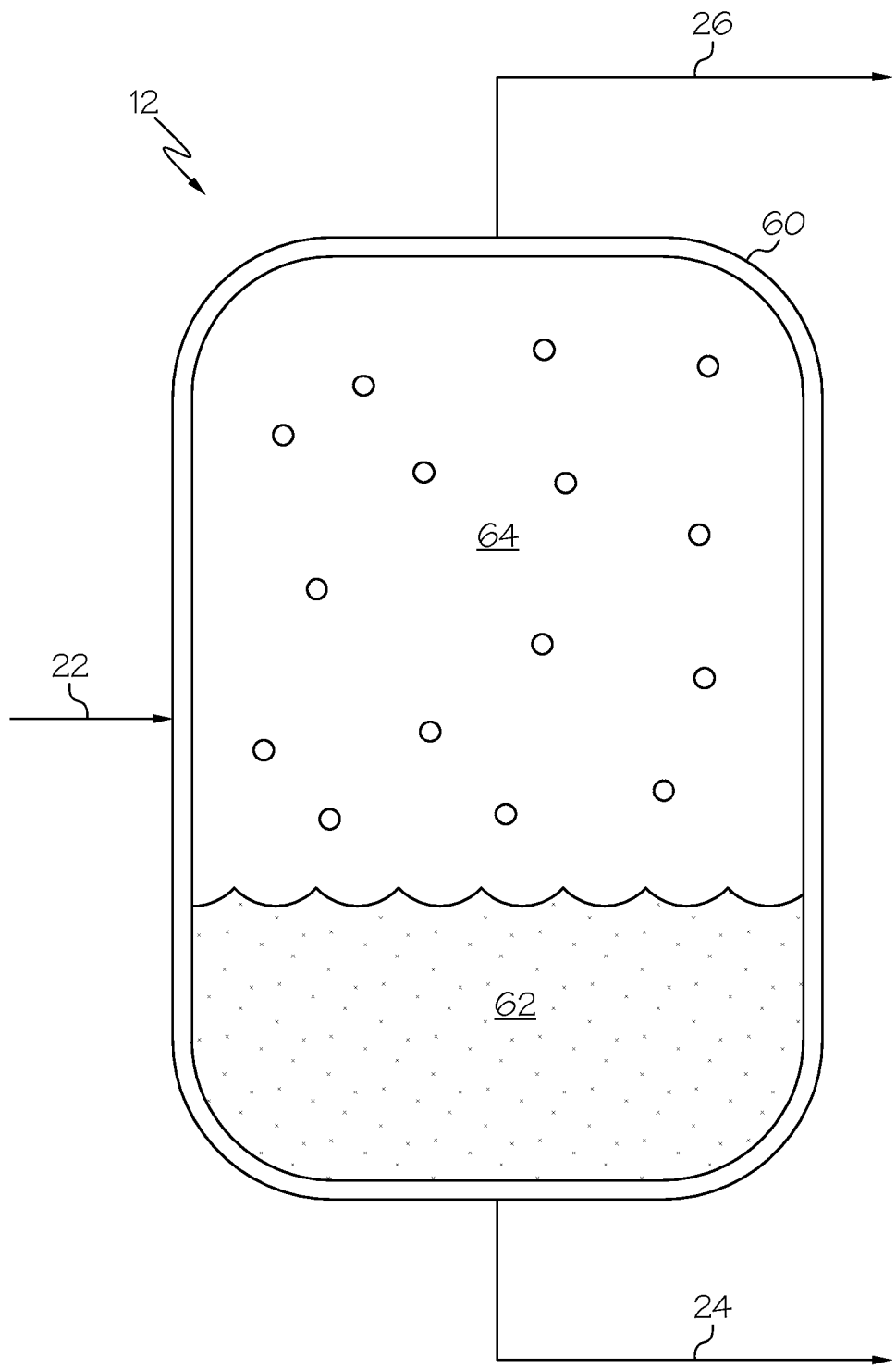
FIG. 3 is a side elevational view, in section, of a pressure vessel being used as the separation unit of the separation system of FIG. 1.

Referring to FIG. 3, in another realization of the disclosed carbon dioxide separation system, the separation unit 12 may be (or may include) a pressure vessel 60 in which the pressure of the gaseous mixture may be increased to effect liquefaction. Specifically, by increasing the pressure of the gaseous mixture within the pressure vessel 60, the gaseous mixture may separate into at least a first fraction 62 and a second fraction 64. The first fraction 62 may be in a liquid phase and the second fraction 64 may be in a gaseous phase. The first fraction 62 may exit the pressure vessel 60 by way of fluid line 24 and the second fraction 64 may exit the pressure vessel by way of fluid line 26.

The pressure vessel 60 may be any vessel capable of housing the gaseous mixture at elevated pressures. In one construction, the pressure vessel 60 may be capable of withstanding pressures of at least 80 atm. In another construction, the pressure vessel 60 may be capable of withstanding pressures of at least 90 atm. In another construction, the pressure vessel 60 may be capable of withstanding pressures of at least 100 atm. In another construction, the pressure vessel 60 may be capable of withstanding pressures of at least 150 atm. In yet another construction, the pressure vessel 60 may be capable of withstanding pressures of at least 200 atm.

When the gaseous mixture is recovered from an oil well and is primarily comprised of carbon dioxide, as discussed above, the first fraction 62 may be substantially purified carbon dioxide and the second fraction 64 may include lighter molecular weight constituents, such as water vapor and methane. As one example, the first fraction 62 may include at least 95 percent by weight carbon dioxide. As another example, the first fraction 62 may include at least 96 percent by weight carbon dioxide. As another example, the first fraction 62 may include at least 97 percent by weight carbon dioxide. As another example, the first fraction 62 may include at least 98 percent by weight carbon dioxide. As yet another example, the first fraction 62 may include at least 99 percent by weight carbon dioxide.

The pressure required to achieve liquefaction within the pressure vessel 60 may depend on a variety of factors, including the composition of the gaseous mixture and the concentrations of the various constituents that comprise the gaseous mixture. When the gaseous mixture is recovered from an oil well and is primarily comprised of carbon dioxide, as discussed above, relatively low pressures may be sufficient to achieve liquefaction.

Carbon dioxide condenses to a liquid at a relatively low partial pressure compared to many other gases, such as hydrocarbons. For example, pure carbon dioxide may condense to a liquid at about 1000 psi (68 atm). As another example, a gaseous mixture containing about 90 percent by weight carbon dioxide (balance methane) may undergo liquefaction at about 1300 psi (88 atm). Therefore, without being limited to any particular theory, it is believed that liquefaction may be a relatively low cost method for separating carbon dioxide from a gaseous mixture, particularly when the gaseous mixture includes a relatively high concentration of carbon dioxide, due to the relatively low pressures required to achieve liquefaction.

Thus, the pressure vessel 60 may be pressurized to a pressure sufficient to condense at least one constituent (e.g., carbon dioxide) of the gaseous mixture. In one variation, the pressure vessel 60 may be pressurized to a pressure of at least 1000 psi (68 atm). In another variation, the pressure vessel 60 may be pressurized to a pressure of at least 1300 psi (88 atm). In another variation, the pressure vessel 60 may be pressurized to a pressure of at least 1400 psi (95 atm). In another variation, the pressure vessel 60 may be pressurized to a pressure of at least 1600 psi (109 atm). In another variation, the pressure vessel 60 may be pressurized to a pressure of at least 1800 psi (122 atm). In yet another variation, the pressure vessel 60 may be pressurized to a pressure of at most 2000 psi (136 atm).

Also disclosed are methods for separating a gaseous mixture into a first fraction and a second fraction. The disclosed separation methods may be used to separate carbon dioxide from, for example, the gaseous effluent of an oil well's gas-oil separator, though various other applications for the disclosed methods are also contemplated.

Figure 4:
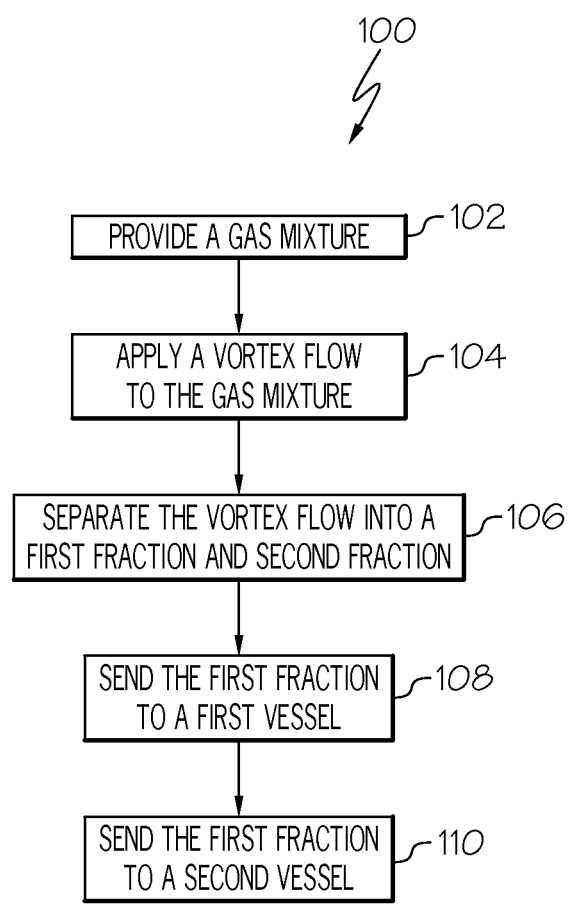
FIG. 4 is a flow chart depicting one embodiment of the disclosed carbon dioxide separation method (the vortex method)

Referring to FIG. 4, one embodiment of the disclosed method for separating a gaseous mixture, generally designated 100, may begin at Block 102 with the step of obtaining a gaseous mixture. As described above, the gaseous mixture may be a carbon dioxide-containing mixture recovered from an oil well during EOR. Use of other gaseous mixtures is also contemplated.

As shown at Block 104, the gaseous mixture may be directed into a vortex flow path. Various apparatus and systems may be used to apply a vortex flow to the gaseous mixture. For example, static or dynamic vortex separators may be used.

With the gaseous mixture in a vortex flow, a first fraction (e.g., a carbon dioxide-containing fraction) of the gaseous mixture may be separated from a second fraction (e.g., a light hydrocarbon-containing fraction), as shown at Block 106. After separation, the first fraction may be sent to a first vessel (Block 108) and the second fraction may be sent to a second vessel (Block 110).

Optionally, the steps shown in Blocks 104 and 106 may be repeated one or more times, such as by using multiple vortex separators in series, to further purify the first fraction, the second fraction or both fractions.

Figure 5:
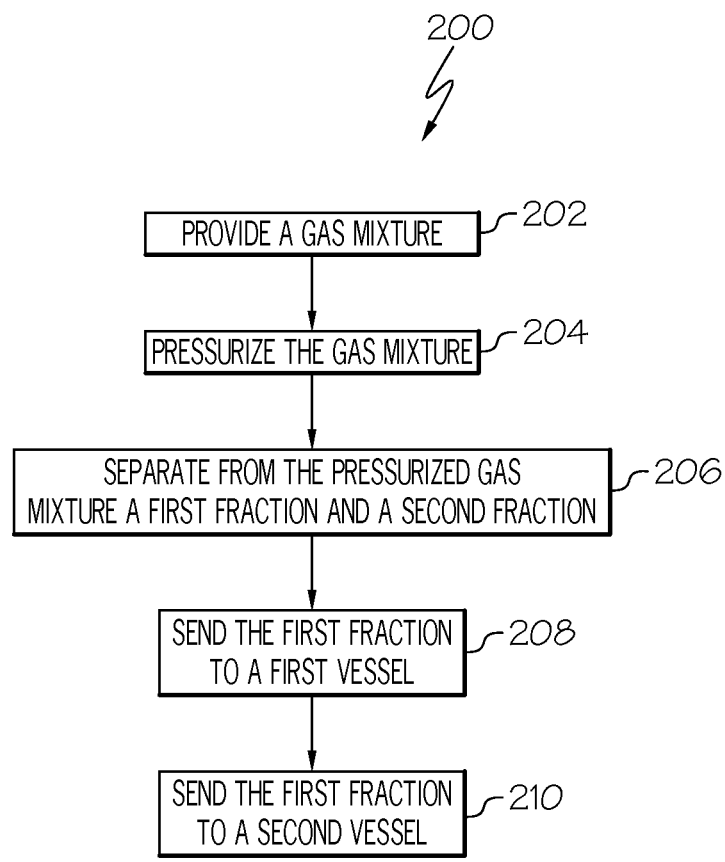
FIG. 5 is a flow chart depicting another embodiment of the disclosed carbon dioxide separation method (the liquefaction method).

Referring to FIG. 5, another embodiment of the disclosed method for separating a gaseous mixture, generally designated 200, may begin at Block 202 with the step of obtaining a gaseous mixture. As described above, the gaseous mixture may be a carbon dioxide-containing mixture recovered from an oil well during EOR, and may have a relatively high concentration (e.g., 80 percent by weight or more) of carbon dioxide. Use of other gaseous mixtures is also contemplated.

As shown in Block 204, the gaseous mixture may be pressurized to a pressure sufficient to form a liquid phase and a gaseous phase. For example, the gaseous mixture may be pressurized by pumping the gaseous mixture into a pressure vessel to achieve the desired pressure.

With the gaseous mixture pressurized, a first, liquid fraction (e.g., a carbon dioxide-containing fraction) of the gaseous mixture may be separated from a second, gaseous fraction (e.g., a light hydrocarbon-containing fraction), as shown at Block 206. After separation, the first fraction may be sent to a first vessel (Block 208) and the second fraction may be sent to a second vessel (Block 210).

Accordingly, the disclosed systems and methods may facilitate separation of one or more constituents (e.g., carbon dioxide) of a gaseous mixture from one or more other constituents of the gaseous mixture without consuming (e.g., burning) any of the constituents. As such, the separated first and second fractions may be used in various downstream applications, such as EOR and energy generation.

Although various embodiments of the disclosed carbon dioxide separation systems and methods have been shown and described, modifications may occur to those skilled in the art upon reading the specification. The present application includes such modifications and is limited only by the scope of the claims.

What is claimed is:

1. A separation system comprising:
    a source of a gaseous mixture, said gaseous mixture comprising a carbon dioxide component and a hydrocarbon component, wherein said carbon dioxide component comprises at least 80 percent by weight of said gaseous mixture;
    a separation unit in communication with said source to receive said gaseous mixture and at least partially separate said carbon dioxide component from said hydrocarbon component, wherein said separation unit comprises at least one of a vortex separator and a pressure vessel;
    a generator receiving said hydrocarbon component; and
    an oil well application receiving said carbon dioxide component.

2. The separation system of claim 1 further comprising a pump between said source and said separation unit.

3. The separation system of claim 1 wherein said gaseous mixture further comprises water.

4. The separation system of claim 1 further comprising a first vessel positioned between said separation unit and said oil well application and a second vessel positioned between said separation unit and said generator.

5. The separation system of claim 1 wherein said carbon dioxide component comprises at least 85 percent by weight of said gaseous mixture.

6. The separation system of claim 1 wherein said carbon dioxide component comprises at least 90 percent by weight of said gaseous mixture.

7. The separation system of claim 1 wherein said carbon dioxide component comprises at least 95 percent by weight of said gaseous mixture.

8. A separation method comprising the steps of:
    providing a gaseous mixture comprising a carbon dioxide component and a hydrocarbon component, wherein said carbon dioxide component comprises at least 80 percent by weight of said gaseous mixture;
    directing said gaseous mixture into a vortex flow path, wherein said vortex flow path effects at least partial separation of said carbon dioxide component from said hydrocarbon component;
    sending said separated hydrocarbon component to a generator; and
    sending said separated carbon dioxide component to an oil well application.

9. The method of claim 8 wherein said gaseous mixture further comprises water.

10. The method of claim 8 wherein said separated carbon dioxide component comprises at least 90 percent by weight carbon dioxide.

11. The method of claim 8 wherein said oil well application comprises enhanced oil recovery.

12. The method of claim 8 wherein said generator generates electrical energy by combusting said separated hydrocarbon component.

13. The method of claim 8 wherein said carbon dioxide component comprises at least 85 percent by weight of said gaseous mixture.

14. The method of claim 8 wherein said carbon dioxide component comprises at least 90 percent by weight of said gaseous mixture.

15. The method of claim 8 wherein said carbon dioxide component comprises at least 95 percent by weight of said gaseous mixture.

* * * * *